United States Patent
Pong (10) Patent No.: US 11,883,897 B1
(45) Date of Patent: Jan. 30, 2024

(54) FLASH WELDING FOR BILLETS WITH DOWN CUT BILLET ENDS

(71) Applicant: David Teng Pong, Hong Kong SAR (CN)

(72) Inventor: David Teng Pong, Hong Kong SAR (CN)

( * ) Notice: Subject to any disclaimer, the term of this patent is extended or adjusted under 35 U.S.C. 154(b) by 0 days.

(21) Appl. No.: 18/169,116

(22) Filed: Feb. 14, 2023

(30) Foreign Application Priority Data

Sep. 8, 2022 (GB) .................................. 2213171
Nov. 8, 2022 (GB) .................................. 2216645

(51) Int. Cl.
*B23K 11/04* (2006.01)
*B23C 3/12* (2006.01)

(52) U.S. Cl.
CPC .............. *B23K 11/04* (2013.01); *B23C 3/12* (2013.01)

(58) Field of Classification Search
CPC ........ B23K 11/04; B23K 28/00; B23K 7/102; B23K 7/06; B23D 47/04
See application file for complete search history.

(56) References Cited

U.S. PATENT DOCUMENTS

| | | | |
|---|---|---|---|
| 4,577,384 A * | 3/1986 | Bricmont | B21B 15/0085 264/108 |
| 5,709,585 A | 1/1998 | Matsuo et al. | |
| 5,829,117 A | 11/1998 | Okawa et al. | |
| 5,931,370 A | 8/1999 | Poloni et al. | |
| 5,951,220 A | 9/1999 | Katsura et al. | |
| 5,957,367 A | 9/1999 | Matsuo et al. | |
| 5,957,368 A | 9/1999 | Takebayashi et al. | |
| 5,992,001 A * | 11/1999 | Roloff | B22D 19/04 228/5.7 |
| 6,010,055 A | 1/2000 | Tazoe et al. | |
| 6,041,993 A | 3/2000 | Matsuo et al. | |
| 6,089,441 A | 7/2000 | Matsuo et al. | |
| 6,189,763 B1 | 2/2001 | Tazoe et al. | |
| 6,227,953 B1 | 5/2001 | Matsuo et al. | |
| 6,257,812 B1 | 7/2001 | Tazoe et al. | |
| 6,273,324 B1 | 8/2001 | Matsuo et al. | |
| 6,371,358 B1 | 4/2002 | Virginio et al. | |
| 6,386,420 B2 | 5/2002 | Matsuo et al. | |
| 6,402,010 B1 * | 6/2002 | Virginio | B21B 15/0085 228/5.7 |
| 6,406,413 B2 | 6/2002 | Tazoe et al. | |
| 6,538,228 B2 | 3/2003 | Lara et al. | |
| 8,395,073 B2 | 4/2013 | Okawa | |
| 9,085,382 B2 * | 7/2015 | Pong | B23D 36/0033 |

(Continued)

FOREIGN PATENT DOCUMENTS

CN 103817422 A 5/2014
CN 212599877 U 2/2021

(Continued)

OTHER PUBLICATIONS

Combined Search and Examination Report in application GB2216645.8 dated May 9, 2023.

*Primary Examiner* — Brian W Jennison
(74) *Attorney, Agent, or Firm* — Buchalter; Jason W. Croft (57) ABSTRACT

The present disclosure is directed to methods and apparatuses for welding together steel billets for forming endless bar for continuously rolling into a rolled product. In particular, the apparatuses and methods disclosed herein are for use in welding together steel billets having down cut ends.

16 Claims, 7 Drawing Sheets

(56) References Cited

U.S. PATENT DOCUMENTS

| | | | |
|---|---|---|---|
| 2001/0015367 A1 | 8/2001 | Matsuo et al. | |
| 2001/0056014 A1 | 12/2001 | Tazoe et al. | |
| 2006/0278615 A1 | 12/2006 | Okawa | |
| 2011/0036137 A1* | 2/2011 | Pong | B23D 36/0016 72/203 |
| 2013/0086870 A1* | 4/2013 | Pong | B23D 36/0016 53/399 |
| 2016/0167149 A1* | 6/2016 | Kojo | B22D 11/126 148/195 |
| 2021/0121972 A1 | 4/2021 | Trinco et al. | |

FOREIGN PATENT DOCUMENTS

| | | |
|---|---|---|
| EP | 0925852 A2 | 6/1999 |
| JP | 04105701 A | 4/1992 |
| JP | 06238301 A | 8/1994 |
| JP | 11156636 A | 6/1999 |
| JP | 4288552 B2 | 4/2009 |
| KR | 101128940 B1 | 3/2012 |
| KR | 101387334 B1 | 4/2014 |
| WO | 97/02907 A1 | 1/1997 |
| WO | 97/03778 A1 | 2/1997 |
| WO | 2005/039790 A2 | 5/2005 |

\* cited by examiner

FLASH WELDING FOR BILLETS WITH DOWN CUT BILLET ENDS

TECHNICAL FIELD

The present disclosure is directed to methods and apparatuses for welding together steel billets for forming endless bar for continuously rolling into a rolled product. In particular, the apparatuses and methods disclosed herein are for use in welding together steel billets having down cut ends.

BACKGROUND

In steel rolling mills, square billets of typically 150 mm×150 mm×12 m weighing 2 tons each are heated in a Reheating Furnace and then rolled into various sections and sizes. Since the final steel products are usually sold in 12 metres commercial lengths, the 2 ton billet will invariably have odd final lengths less than 12 metres for different sizes and types of the finished products. This loss can be 5% or more. To mitigate this the heated billets may be flash welded before entering the first stand of a rolling mill. The tail end of the first billet is welded to the front end of the second billet and so on. This may be known as "Endless Bar Rolling" or "Endless Welding Rolling". The result is virtually zero end losses.

Steel billets are predominantely made from Continuous Casting Machines whereby the molten steel is solidified into infinitely long square profile billets continuously while going through such a machine. The solidified square billets have to be cut into billets, using various methods and apparatuses, into convenient lengths, usually 12 m, as intermediate steel products for subsequent rolling in a subsequent rolling process in a hot rolling mill, to produce the rolled steel as a finished product. Thus, the intermediate billets are for subsequent charging into a Reheating Furnace in another shop floor in a steel rolling mill for flash welding to form endless bar and rolling into final rolled products.

As the billets exit the Reheating Furnace, the tail end of the first billet and the front end of the second billet are heated by passing a high electrical current to partially melt these ends. Then these ends are pressed together to fuse them to form a flash weld, and the welded billets can then be rolled continuously. Just before the flash welded joint passes the first rolling stand, the excess weld at the joint is shaved off so that it will not be rolled into the finished products as a surface imperfection. The shaving of the excess welds can be challenging. Thus far, in order to obtain a clean shaved joint, uniform square cross sections of the welded billets are needed to be welded together.

It is in the above context that the present disclosure has been devised.

SUMMARY OF THE INVENTION

There are three types of cutting of the billets in the billet manufacture process and each has different effects on the cross section of the billet cut faces; "Flame Cut", "Diagonal Cut", and "Down Cut".

The flash welding of "Flame Cut" and "Diagonal Cut" billet ends has been successful because these have suitably uniform square cross sections, but the successful flash welding of billets with the deformed "Down Cut" billet ends has been not possible because of their severe deformations at the billet ends. Each down cut end comprises a deformation in a cross section of the billet by one side surface of the billet extending increasingly inwardly into a profile of the billet in an end region of the billet, relative to a normal square cross sectional profile of the billet away from the end portion of the billet, with the deformation resulting from a previous cutting operation (e.g. a cutting operation in a continuous casting process for manufacturing the billets).

This arises because, although the normal flash welding process of down cut billet ends can be performed (i.e. the electric arc melting of the billets and the pressing of them together to form a weld), the welded joints produced thereby cannot be properly shaved clean by deburring and would be rolled into the end products as surface imperfections or "scabs" and rejected as scrap.

It has been realised by the present inventor that, with a relatively uniform square cross section, such as those resulting from the "Flame Cut" and "Diagonal Cut", the orientation of the billet along its axis in relation to the next one to be flash welded does not matter and excess welds are successfully shaved off whatever the relative orientation of the billets. However, for an irregular cross section of the billet ends like from the "Down Cut", a perfect clean shaved welded joint cannot be achieved, particularly where the deburring cutter cannot access the weld in the 'down cut' joint, and so the excess weld will be rolled into surface imperfections of the final products.

In this regard, it has been realised that the problem of flash welding such "Down Cut" billet ends arises due to the random orientation of the billets along its axis when presented for the flash welding, which can be on any of four sides.

Viewed from one aspect, the present disclosure provides a method for welding together steel billets having down cut ends. Each down cut end comprises a deformation in a cross section of the billet by one side surface of the billet extending increasingly inwardly into a profile of the billet in an end region of the billet relative to a normal square cross sectional profile of the billet away from the end portion of the billet, the deformation resulting from a previous cutting operation. The present method uses a flash welding device and one or more shaving cutters, for removing excess weld material, to form endless bar for continuously rolling into a rolled product.

The present method comprises steps of: determining an orientation of a down cut end of the front of a billet to be welded to a rear of a previously welded billet; determining, based on the orientation, whether the billet to be welded to the previously welded billet needs to be rotated around a longitudinal axis of the billet to align the down cut end at the front of the billet to a down cut end of the rear of the previously welded billet, so that a weld to be formed by the flash welding device can be deburred successfully by the shaving cutters; operating a billet rotation means, based on the determined rotation, to rotate the billet around the longitudinal axis of the billet, to form endless bar for continuously rolling into a rolled product; flash welding the aligned billets using the flash welding device; and deburring the excess weld material from the flash welded joint of the formed endless bar with the one or more shaving cutters.

The welding of steel billets with down cut ends to form endless bar has not previously been achieved and would allow manufacturers, who make use of endless bar rolling, to have the means to make rolled steel products from billets of any cut, as the excess weld material formed in the flash welding process can reliably be removed, and scabs in the finished rolled products can be avoided.

This is achieved by rotating the billets, around a longitudinal axis of the billet, to complimentarily or oppositely align the down cut ends of the billets, such that the excess weld material of the flash welded joint is able to be successfully deburred in subsequent processing steps. If the down cut ends of the billets are not aligned in this way the deformations obstruct the shaving cutters from reaching the excess weld material to successfully deburr the weld joint.

Successful deburring with "Flame Cut" and "Diagonal Cut" billets is possible with a random presentation of the billet orientation as these retain their square cross section and as such can be flash welded and successfully deburred irrespective of their orientation.

The rolled products produced from the endless bar can include products such as reinforcing bar (known also as rebar), sheet steel, and steel plates.

In embodiments, the cutting operation forming the down cut end is characterised by having been performed by a mechanical shear comprising a stationary shear and a moving shear arranged to be on opposite faces of the billet, with the moving shear moving towards the stationary shear to cut through a cross section of the billet in between; and with the resultant deformation causing the surface of one side of the billet to extend inwardly into the profile of the billet by at least 25 mm or more, or by at least 10% of the thickness of the normal cross sectional profile of the billet. In other embodiments, the surface of one side of the billet to extend inwardly into the profile of the billet by at least 10 mm or more, or 15 mm or more, or 20 mm or more, or 30 mm or more, or 35 mm or more, or 40 mm or more. In other embodiments, the surface of one side of the billet to extend inwardly into the profile of the billet by at least 5% of the thickness of the normal cross sectional profile of the billet, or by at least 7% of the thickness of the normal cross sectional profile of the billet, or by at least 12% of the thickness of the normal cross sectional profile of the billet, or by at least 15% of the thickness of the normal cross sectional profile of the billet, or by at least 17% of the thickness of the normal cross sectional profile of the billet, or by at least 20% of the thickness of the normal cross sectional profile of the billet. At the opposite surface, some deformation away from the normal billet profile may be formed, such that the opposite surface extends outwardly, although typically by a smaller amount over a shorter length.

In embodiments, the deformed down cut end region of the billet comprises at least 10 centimetres at the end of the billet. This is due to the forces the billet end is subjected to during the cutting operation. In other embodiments, the deformed down cut end region of the billet comprises at least 5 centimetres at the end of the billet, or at least 7 centimetres at the end of the billet, or at least 12 centimetres at the end of the billet, or at least 15 centimetres at the end of the billet, or at least 17 centimetres at the end of the billet, or at least 20 centimetres at the end of the billet, or at least 25 centimetres at the end of the billet, or at least 30 centimetres at the end of the billet.

In embodiments, the method further comprises: controlling the flash time and the upsetting distance of the flash welding device to be sufficient such that the excess weld material protrudes out of the profile of the billets, on the side of the deformed surface of the down cut ends of the billets, to allow the excess weld material to be successfully deburred by one or more shaving cutters.

In embodiments, the shaving cutters may be configured to cut inside the profile of the normal square cross section of the welded endless bar on at least the side of the deformed surface of the down cut ends of the billets in order that the depth of the cut is sufficient to remove all of the excess weld material from the flash welding joint.

In embodiments, the rotation of the billet, to be welded to a previously welded billet, around its longitudinal axis is to complimentarily align the down cut ends of the billets to be welded together in the same direction, or oppositely align the down cut ends of the billets to be welded together in an opposite direction, so that a weld to be formed by the flash welding device can be deburred successfully by the shaving cutters.

In embodiments, the formed endless bar for continuously rolling into rolled products is rolled in a one or more rolling stands such that the rolled product contains no surface imperfections or profile variations from the deburring of the excess weld material.

Viewed from another aspect, the present disclosure provides apparatus for welding together steel billets having down cut ends, each down cut end comprising a deformation in a cross section of the billet by one side surface of the billet extending increasingly inwardly into a profile of the billet in an end region of the billet relative to a normal square cross sectional profile of the billet away from the end portion of the billet, the deformation resulting from a previous cutting operation, the welding being to form endless bar for continuously rolling into rolled product.

In embodiments, the apparatus comprises a billet orientation determining means for determining an orientation of a down cut end of the front of a billet to be welded to a rear of a previously welded billet, and determining, based on the orientation, whether the billet to be welded to the previously welded billet needs to be rotated around a longitudinal axis of the billet to align the down cut end at the front of a billet to a down cut end of the rear of the previously welded billet; a billet rotation device configured to rotate the billet, based on the determined rotation, around its longitudinal axis of the billet to achieve the alignment; a flash welding device for flash welding the aligned billets to form endless bar for rolling; one or more shaving cutters for deburring excess weld material from the weld joint between the billets, the determined rotation being so that a weld to be formed by the flash welding device can be deburred successfully by the shaving cutters.

In embodiments, the billet rotation means rotates the billet, to be welded to a previously welded billet, around its longitudinal axis to complimentarily align the down cut ends of the billets to be welded together in the same direction, or oppositely align the down cut ends of the billets to be welded together in an opposite direction, so that a weld to be formed by the flash welding device can be deburred successfully by the shaving cutters.

In embodiments, the flash welding device is configured such that the flash time and the upsetting distance of the flash welding device are sufficient such that the excess weld material protrudes out of the profile of the billets on the side of the deformed surface of the down cut ends of the billets to allow the excess weld material to be successfully deburred by one or more shaving cutters.

In embodiments, a reheat furnace is arranged for heating each billet before flash welding so that the formed endless bar is sufficiently malleable to be rolled into rolled products.

In embodiments, the billet orientation determining means comprises one or more cameras coupled to one or more processors, positioned between the reheat furnace and the flash welding device, for determining the orientation of the down cut end of a billet. This allows for the billet orientation determining to be done at a distance from the rest of the apparatus such that the heat of a reheat furnace, a steel billet, or a flash welding device, does not damage the billet orientation determining means. The billet orientation determining may also be performed automatically by the processors analysing the observed billet in the camera feed, determining an orientation of the billet, and determining an appropriate rotation of the billet to align with the billed in front to be welded to.

In embodiments, the apparatus further comprises one or more rolling stands used to continuously roll the formed endless bar into rolled products, such as those mentioned above.

In embodiments, the shaving cutters comprise separate cutting means for each profile surface of the endless bar, in order that the excess weld material can be removed from each of these profile surfaces.

In embodiments, the shaving cutters are configured to cut inside the profile of the normal square cross section of the welded endless bar on at least the side of the deformed surface of the down cut ends of the billets in order that the depth of the cut is sufficient to remove all of the excess weld material from the flash welding joint.

In embodiments, the apparatus further comprises one or more shaving cutters for deburring the weld such that the endless bar can be continuously rolled into rolled products, by one or more rolling stands, without surface imperfections from excess weld material.

DETAILED DESCRIPTION

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. Furthermore, terms "comprises," "comprising," or any other variation thereof, are intended to cover a non-exclusive inclusion, such that apparatuses and method steps that comprises a list of elements or steps does not include only those elements but may include other elements or steps not expressly listed or inherent. An element or step proceeded by "comprises . . . a" does not, without more constraints, preclude the existence of additional identical elements or steps that comprises the element or step.

Figure 4:
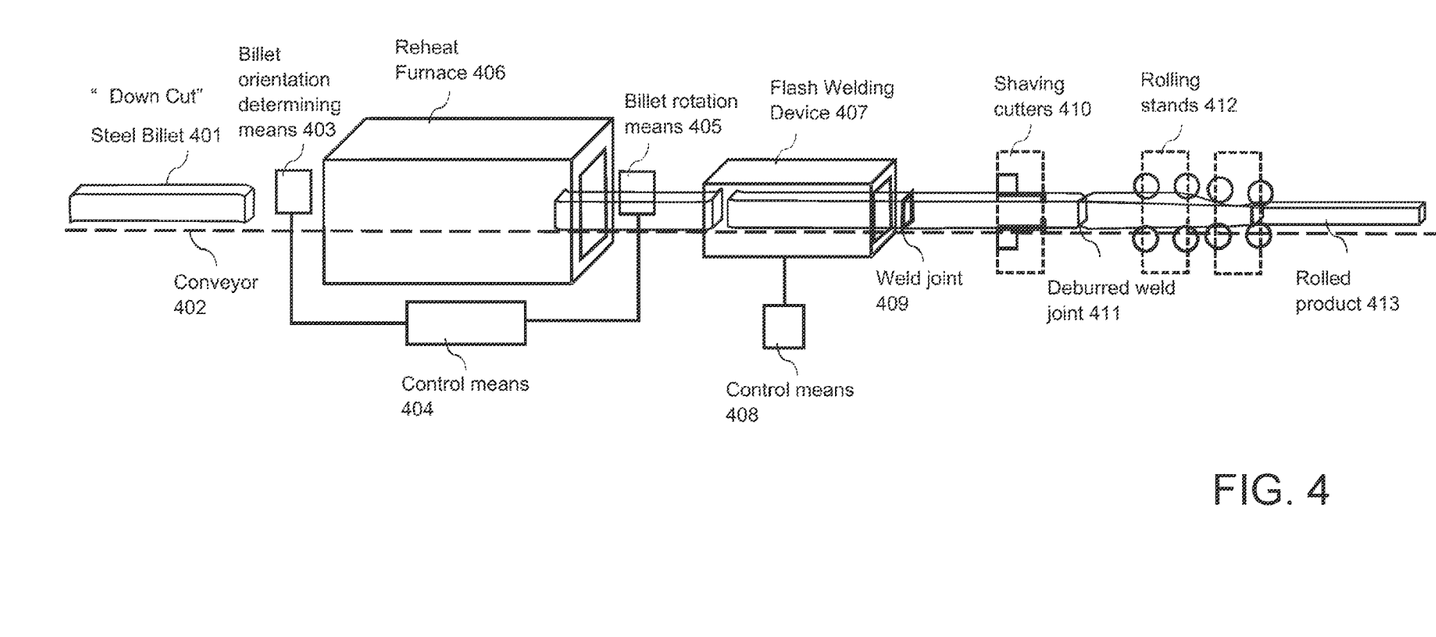
FIG. 4 is a schematic diagram of the apparatus for successfully welding together "Down Cut" billets into endless bar for rolling into rolled products.

Referring now to FIG. 4, this shows a schematic illustration of an embodiment of an apparatus for successfully welding together "Down Cut" billets into endless bar for rolling into rolled products in accordance with aspects of the present disclosure. FIG. 4 shows a "Down Cut" steel billet 401, of a sequence of such billets, to be welded together into endless bar, a conveyor 402 for conveying the steel billets through along the processing line, a reheat furnace 406, a flash welding device 407 and associated control means 408, shaving cutters 410, and rolling stands 412.

The reheat furnace 406 is arranged and operated to heat the steel billets 406 so that the billets will be suitably malleable for rolling into rolled product 413 by the rolling stands 412.

The flash welding device 407 is controlled by control means 408, and is configured with means to move along the conveyor 402 with the steel billets in order to successfully flash weld the steel billets together to form a weld joint 409 therebetween.

The shaving cutters 410 are for removing the excess weld material from the weld joint 409, also known as deburring. This produces a deburred weld joint 411 as seen in FIG. 4, and if this process did not occur or occurred unsuccessfully the rolled products 413 formed would include surface imperfections or "scabs" from pressed in excess weld material.

The rolling stands 412 are configured to roll the formed endless bar into rolled products 413, such as rebar or steel plate, and smooth out any concavity or shaving deformations formed in the surfaces endless bar after passing through the shaving cutters 410.

Figure 1A:
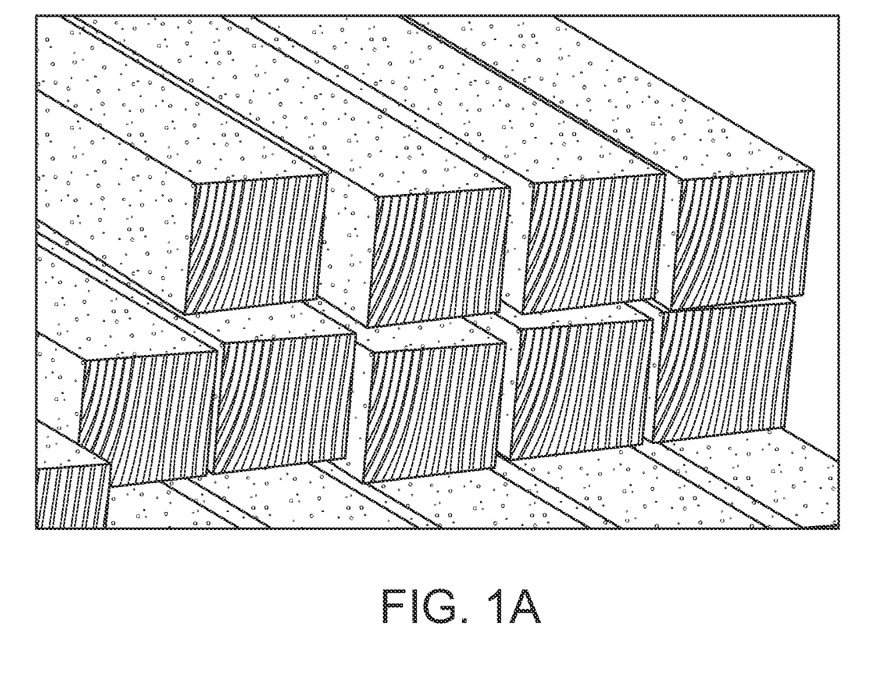
FIG. 1a is a diagram of "Flame Cut" billets, showing that they retain their original square cross section after the cutting operation.

FIG. 1a is a diagram of "Flame Cut" billets, showing that they retain their original square cross section after the cutting operation in the continuous casting process. A "Flame Cut" is performed using fuel gas and oxygen. Because there are no mechanical forces acting in this process, the resultant cross section of the billet ends retain their original square section (see FIG. 1a). This type of billet ends are preferred by manufacturers for flash welding e.g., in an endless bar rolling process, as their square cross section allows them to be welded together using a standard flash welding process without any regard to the billet orientation and without any resulting imperfections. However this method has the disadvantage that there will be some losses with the burning by the fuel gas and oxygen.

Figure 1B:
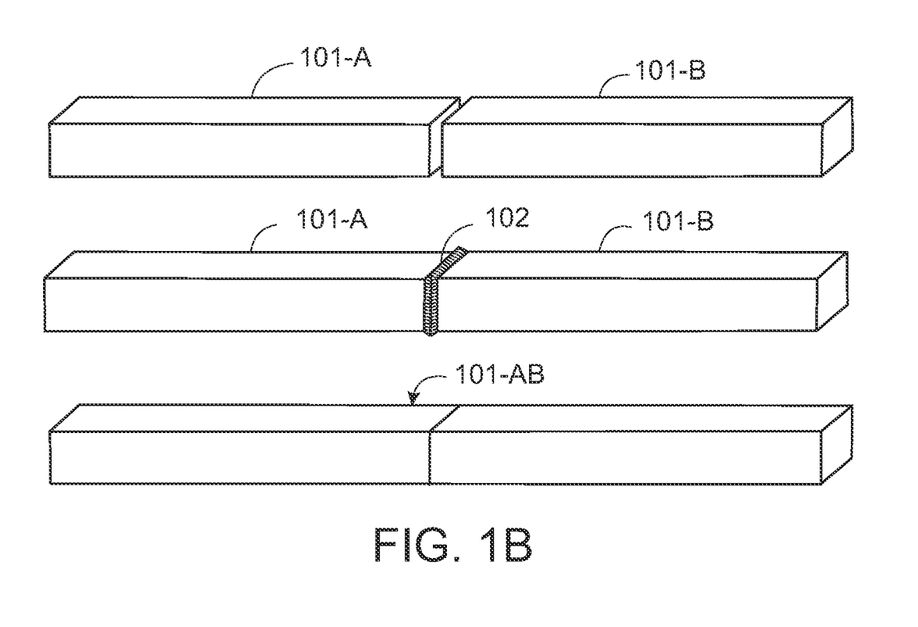
FIG. 1B illustrates "Flame Cut" ends of steel billets and their arrangement for successful flash welding and deburring.

FIG. 1b illustrates "Flame Cut" ends of steel billets and their arrangement for successful flash welding and deburring. This process may be performed using the apparatus of FIG. 4, but the billet rotation means 405 may not be needed or used. Further, the flash welding device 407 and shaving cutters 410 may be operated in the conventional manner to form a weld joint 409 that can be fully deburred. As shown, "Flame Cut" billets 101-A and 101-B are flash welded using a flash welding device, forming endless bar 101-AB and flash welded joint 102, with excess weld material. The excess weld material can be successfully deburred from the flash welded joint 102 of the formed endless bar 101-AB with the one or more shaving cutters.

Figure 2A:
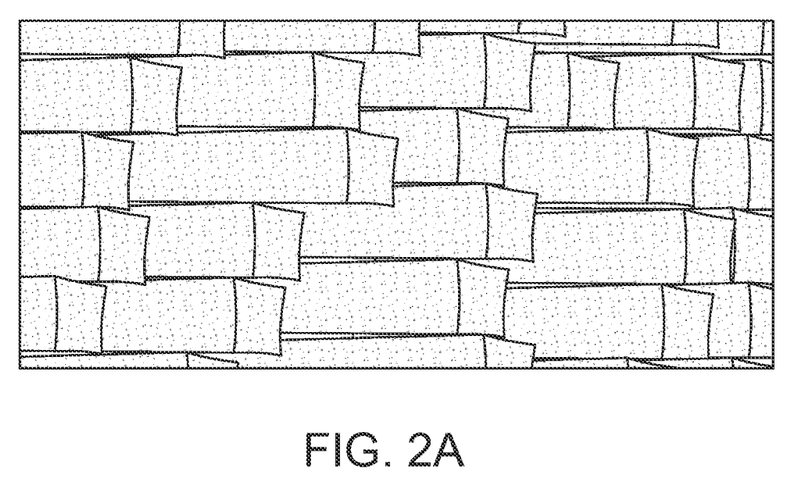
FIG. 2a is a photograph of "Diagonal Cut" billets, showing the minimal deformation of this type of billet.

FIG. 2a is a photograph of "Diagonal Cut" billets, showing the minimal deformation of this type of billet. "Diagonal Cut" billets are cut by mechanical shears diagonally in the continuous casting process. This has some deformation of the resultant cross section of the billets, but still retains a square cross section and is also acceptable with manufacturers for use in flash welding (see FIG. 2a), as their cross section allows them to be welded together using a standard flash welding process without any regard to the billet orientation and without any resulting imperfections.

Figure 2B:
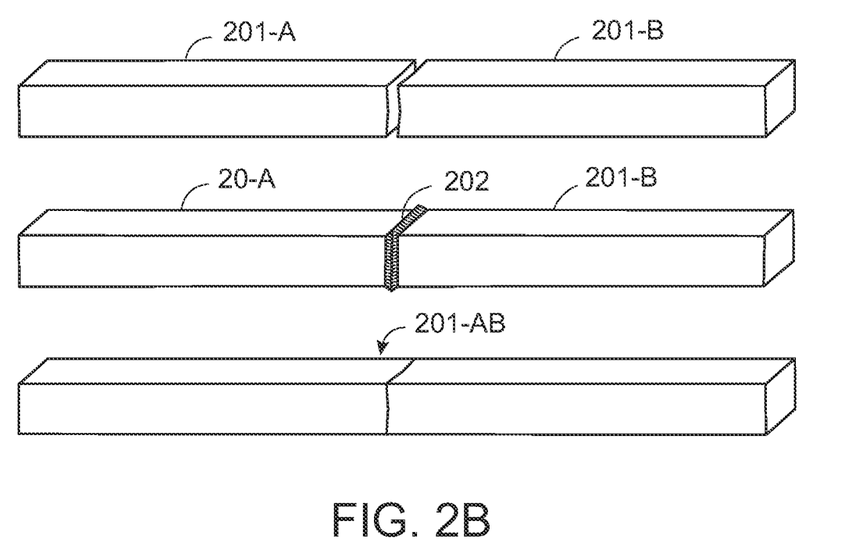
FIG. 2b illustrates diagonal cut ends of steel billets and their arrangement for successful flash welding and deburring.

FIG. 2b illustrates diagonal cut ends of steel billets and their arrangement for successful flash welding and deburring. This process may be performed using the apparatus of FIG. 4, but the billet rotation means 405 may not be needed or used. Further, the flash welding device 407 and shaving cutters 410 may be operated in the conventional manner to form a weld joint 409 that can be fully deburred. As shown, "Diagonal Cut" billets 201-A and 201-B are flash welded using a flash welding device, forming endless bar 201-AB and flash welded joint 202, with excess weld material. The excess weld material can be successfully deburred from the flash welded joint 202 of the formed endless bar 201-AB with the one or more shaving cutters.

Figure 3A:
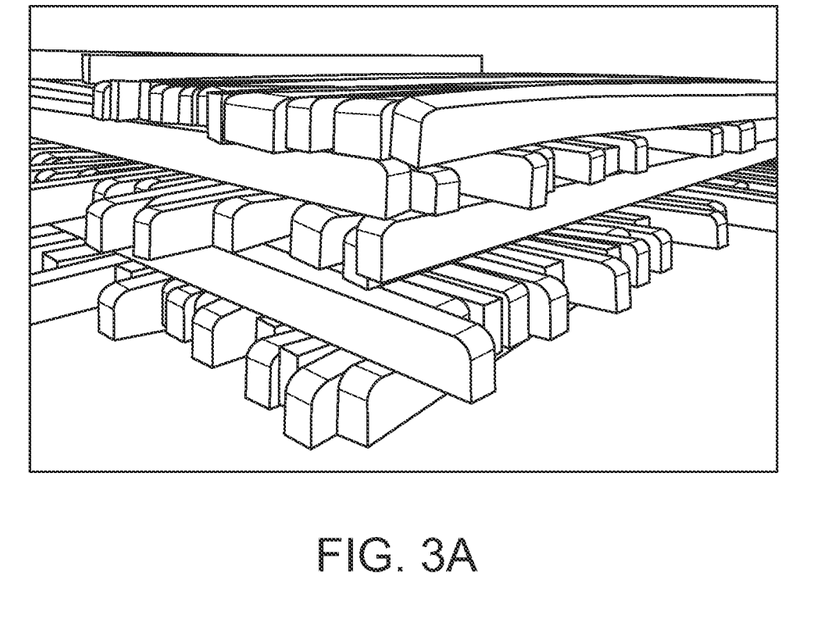
FIG. 3a is a diagram of "Down Cut" billets, showing the deformation characteristic of this kind of billet.

FIG. 3a is a diagram of "Down Cut" billets, showing the deformation characteristic of this kind of billet. In the "Down Cut" method, the cross section of the ends of the billets is severely deformed due to the cutting motion of the shears in the continuous casting process. The mechanical shear may cut the billet from one side face across the profile of the billet. The cutting action of the mechanical shear causes the profile of the billet ends of the 'down cut' surface of the billets to be curved in the longitudinal axis to extend inwardly compared to the normal profile of the billet away from its ends. For example the down cut billet profile may curve inwardly from the normal billet profile over a 100 mm length at the end of the billet, by a distance of around 25 mm or more. For a 150 mm by 150 mm billet, this can represent a 17% deformation in the 'down cut' surface of the billet profile at its end, relative to the billet profile along its length. At the opposite surface, some deformation away from the normal billet profile may be formed, such that the opposite surface extends outwardly, although typically by a smaller amount over a shorter length.

Figure 3B:
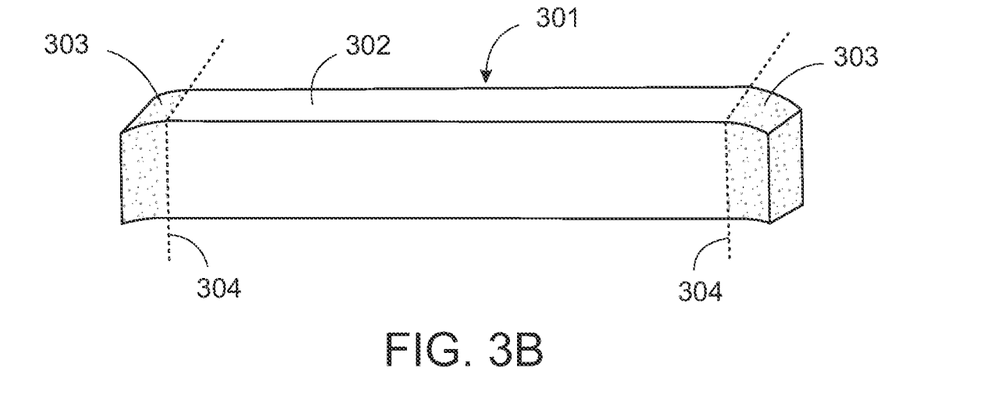
FIG. 3b is a diagram of a "Down Cut" billet 301, showing the deformation of the end regions of the billet and normal square cross sectional profile of the billet being retained away from these end regions.

FIG. 3b is a diagram of a "Down Cut" billet 301, showing the deformation of the end regions of the billet 303 and normal square cross sectional profile 302 of the billet being retained away from these end regions. The shading of the diagram, which only for illustration and does not indicate a physical property of the billet, is to mark which portion of the "Down Cut" billet 301 constitutes the end region 303; where a deformation in the cross section of the billet by one side surface of the billet extends increasingly inwardly into the profile of the billet, relative to a normal square cross sectional profile 302 of the billet away from the end portion of the billet. The dashed lines 304 are to mark the end of the normal square cross sectional profile 302 of the "Down Cut" billet 301 and the start of the deformed down cut end regions 303, which each end region comprising at least 10 cm of the length of the billet.

Figure 3C:
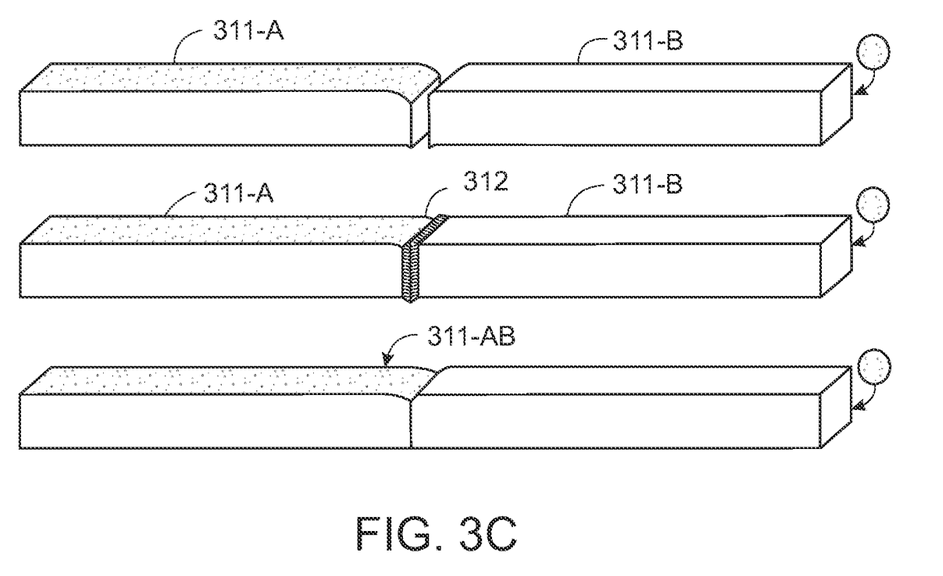
FIG. 3c illustrates steel billets with down cut ends presented for flash welding with orthogonally aligned deformation and the resulting imperfections, due to unsuccessful flash welding and deburring.

FIG. 3c illustrates steel billets 311-A and 311-B with down cut ends presented for flash welding with orthogonally aligned deformations and the resulting imperfections, unsuccessful flash welding and deburring. The top side of the billet, the side which the mechanical shear cuts and deforms in the down cutting operation, is marked by shading, this shading not being used to show any physical characteristic of the billets. As shown, "Down Cut" billets 311-A and 311-B are flash welded using a flash welding device, forming endless bar 311-AB and flash welded joint 312, with excess weld material. Here, this is to illustrate what would happen if the billets 311-A and 311-B are flash welded while orthogonally orientated and no billet rotation means is used to align them (such as would be the case in accordance with the present disclosure). The excess weld material is deburred from the flash welded joint 312 of the formed endless bar 311-AB with the one or more shaving cutters, however this is unsuccessful in removing all of the excess weld material. This is due to the shaving cutters not being able to reach this material as it is within the normal cross section of the billet in a random orientation, and results in the material being rolled into the end products as surface imperfections or "scabs" and the formed products being rejected as scrap.

Figure 3D:
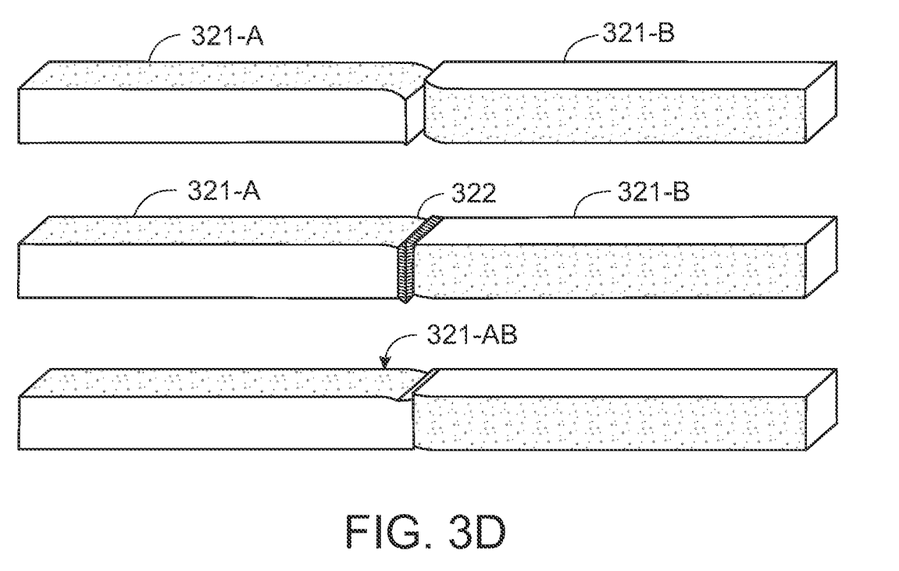
FIG. 3d illustrates steel billets with down cut ends presented for flash welding with differently orthogonally aligned deformations and the resulting imperfections, unsuccessful flash welding and deburring.

FIG. 3d illustrates steel billets 321-A and 321-B with down cut ends presented for flash welding with differently orthogonally aligned deformations and the resulting imperfections, unsuccessful flash welding and deburring. The top side of the billet, the side which the mechanical shear cuts and deforms in the down cutting operation, is marked by shading, this shading not being used to show any physical characteristic of the billets. As shown, "Down Cut" billets 321-A and 321-B are flash welded using a flash welding device, forming endless bar 321-AB and flash welded joint 322, with excess weld material. Again, this is to illustrate what would happen if the billets 311-A and 311-B are flash welded while differently orthogonally orientated and no billet rotation means is used to align them (such as would be the case in accordance with the present disclosure). The excess weld material is deburred from the flash welded joint 322 of the formed endless bar 321-AB with the one or more shaving cutters, however this is unsuccessful in removing all of the excess weld material. This is due to the shaving cutters not being able to reach this material as it is within the normal cross section of the billet in a random orientation, and results in the material being rolled into the end products as surface imperfections or "scabs" and the formed products being rejected as scrap.

To achieve successful flash welding of billets with down cut billet ends, the present inventor has developed a revised process. This includes ensuring each billet is aligned or turned into alignment so that both the bent ends are aligned before welding in a desired alignment, such as that shown in FIG. 3e (oppositely down cut alignment) or FIG. 3f (complementarily down cut alignment).

Figure 3E:
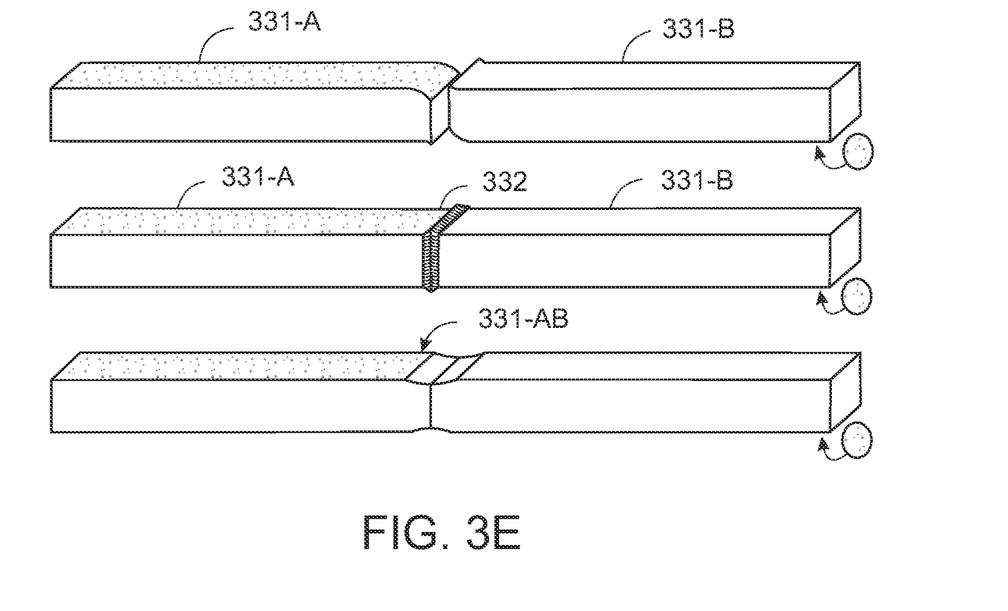
FIG. 3e illustrates steel billets with down cut ends presented for flash welding with deformations aligned in opposite directions and the resultant successful flash welding and deburring.

FIG. 3e illustrates steel billets 331-A and 331-B with down cut ends presented for flash welding with deformations aligned in opposite directions and the resultant successful flash welding and deburring. The top side of the billet, the side which the mechanical shear cuts and deforms in the down cutting operation, is marked by shading, this shading not being used to show any physical characteristic of the billets. As shown, "Down Cut" billets 331-A and 331-B are flash welded using a flash welding device, forming endless bar 331-AB and flash welded joint 332, with excess weld material. The excess weld material can be successfully deburred, from the flash welded joint 332 of the formed endless bar 331-AB with the one or more shaving cutters, as in the oppositely aligned configuration gives excess material on only two sides. Here, the flash welding time or the upset distance, or the shaving cutters may be adapted to as to ensure that the excess weld material reliably formed by the flash welding in a desired side surface of the billet, which may be inside the normal cross sectional profile of the billet, can be reliably removed by the shaving cutters. The shaving cutters may be adapted to cut inside the normal cross sectional profile of the billet on the two sides presenting down cut deformations, although this may not be necessary if the flash welding time and upset distance have been adapted to cause the weld material to reliably extend outside the normal cross sectional profile of the billets.

Figure 3F:
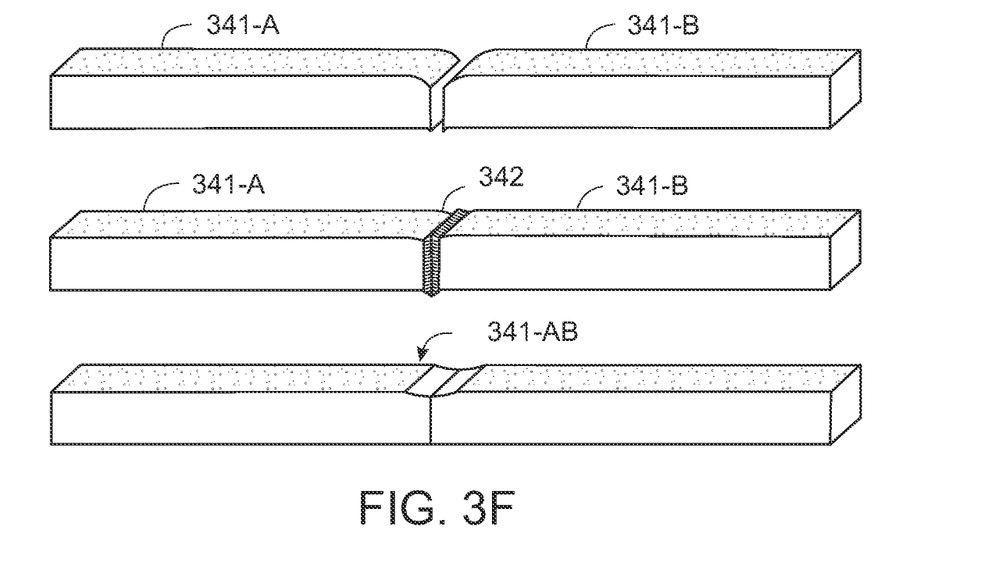
FIG. 3f illustrates steel billets with down cut ends presented for flash welding with deformations aligned in opposite directions and the resultant successful flash welding and deburring.

FIG. 3*f* illustrates steel billets 341-A and 341-B with down cut ends presented for flash welding with deformations complementarily aligned in the same direction and the resultant successful flash welding and deburring. The top side of the billet, the side which the mechanical shear cuts and deforms in the down cutting operation, is marked by shading, this shading not being used to show any physical characteristic of the billets. As shown, "Down Cut" billets 341-A and 341-B are flash welded using a flash welding device, forming endless bar 341-AB and flash welded joint 342, with excess weld material. The excess weld material can be successfully deburred, from the flash welded joint 342 of the formed endless bar 341-AB with the one or more shaving cutters, as in the complementarily aligned configuration gives excess material on only one side. Here, the flash welding time or the upset distance, or the shaving cutters may be adapted to as to ensure that the excess weld material reliably formed by the flash welding in a desired side surface of the billet, which may be inside the normal cross sectional profile of the billet, can be reliably removed by the shaving cutters. The shaving cutters may be adapted to cut inside the normal cross sectional profile of the billet on the two sides presenting down cut deformations, although this may not be necessary if the flash welding time and upset distance have been adapted to cause the weld material to reliably extend outside the normal cross sectional profile of the billets.

As shown in FIG. 4, a billet turning machine 405 can be controlled to rotate the billets align the down cut billet ends before welding. In the flash welding process, the flash time can be extended and the upset distance increased, for example compared to the normal flash time and upset distance for flash welding billets.

The flash time of the flash welding device 407 is the time that the high current electrical arc between, and used for partially melting, the ends of the steel billets is present, and the upsetting distance is the distance over which the steel billets travel on the conveyor 402 travel whilst pressed together, for the function of fusing the partially melted ends of the billets to form the endless bar.

For example, a flash time of greater than 20 seconds may be used, and an upset distance of over 40 mm may be used. The flash time and/or the upset distance can be changed to be sufficient to form a weld in the aligned billet ends that, when shaved by a shaving cutter/deburring machine, ensures that surface imperfections are avoided. This may be achieved by the extended flash time and upset distance causing the excess weld 409 to protrude further out of the profile of the billets, such that the shaving cutter(s) 410 can better access the joint to successfully deburr it.

The billet orientation determining means 403 is used to determine the orientation of the down cut end of the incoming steel billet 401 and is coupled via the control means 404 to the billet rotation means 405, such that the billet to be welded to the previously welded billet can be rotated around its longitudinal axis to align the down cut end at the front of the billet to a down cut end of the rear of the previously welded billet, so that a weld joint 409 to be formed by the flash welding device 407 can be deburred successfully by the shaving cutters 410.

Cameras coupled to a processor configured, e.g. by software, to operate the billet rotation device at the reheat furnace 406 charging side, can be used in order to detect and correct the orientation of the billet (i.e., as the billet orientation determining means 403), which may turn inside the reheat furnace 406. The same camera and rotation device configuration can additionally, or alternatively be used at the discharge side of the reheating furnace (e.g., in case the billet turns while inside the walking hearth furnace). The processor-coupled camera can acquire the image of the tail end of the first billet and can turn the next billet to match the tail end of the previous billet in the configurations shown in either FIG. 3*e* or FIG. 3*f*. In this way the random orientation of the billets has been restricted to complementarily aligned or opposed orientation only and the successful clean shaving of the excess weld joints will be performed accordingly.

The shaving cutter(s) 410 (performing the deburring) may also be configured to take a deeper cut for the down cut face(s) with the inwardly bent ends in order to remove the excess weld formed. This deeper cut may result in a slight concavity in the cross section of the billets at the join, as seen in endless bars 331-AB and 341-AB of FIG. 3. This slight concavity will be dispersed after passing through at least one or two of the rolling stands 413 such that the cross section of the rolled product is equalised along the length, without any imperfections or scabs in the finished product. In this way, the problems of flash welding of "Down Cut" billets can be overcome.

Figure 5:
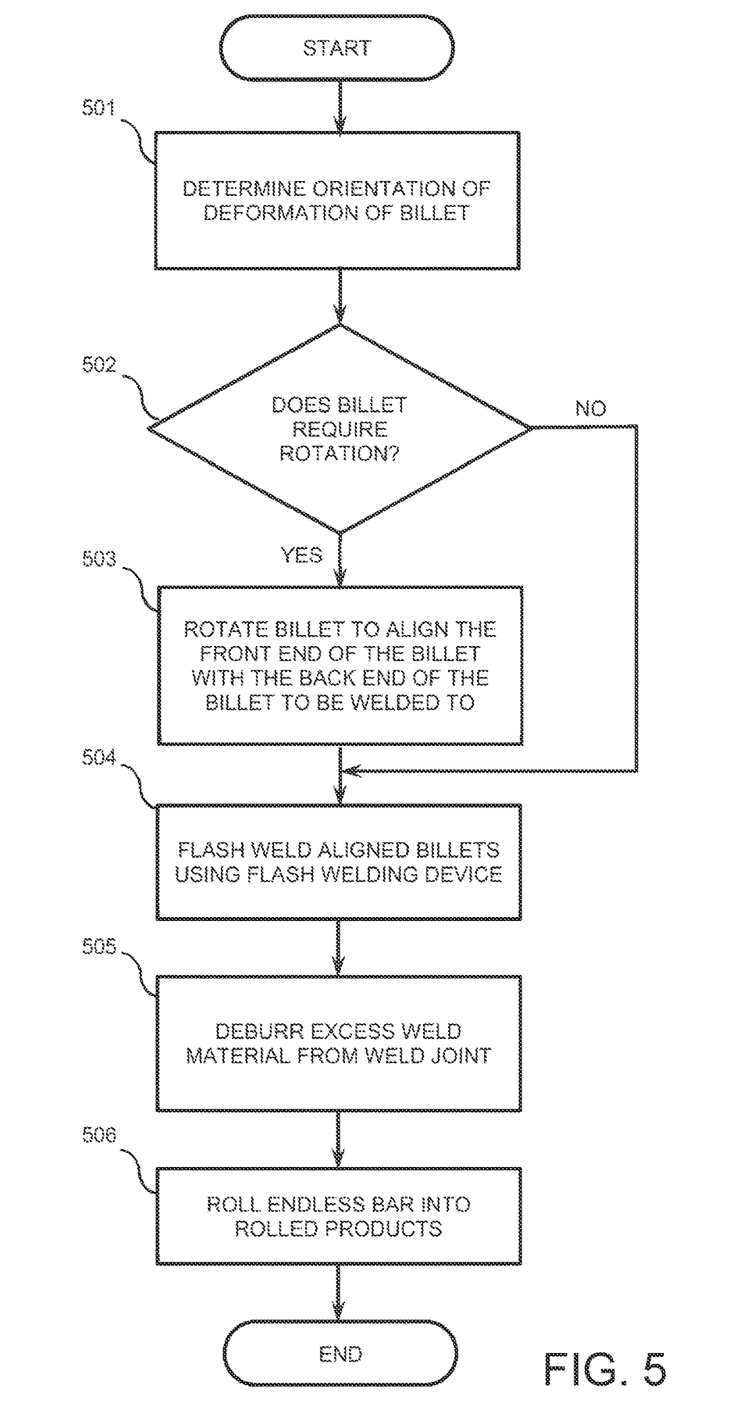
FIG. 5 is a flow chart detailing the method for successfully welding together "Down Cut" billets into endless bar for rolling into rolled products.

FIG. 5 shows a flow chart detailing the method for successfully welding together "Down Cut" billets into endless bar for rolling into rolled products.

In step 501, an orientation of a down cut end of the front of a billet to be welded to a rear of a previously welded billet is determined.

In step 502, a determination is made, based on the determined orientation, whether the billet to be welded to the previously welded billet needs to be rotated around a longitudinal axis of the billet to align the down cut end at the front of the billet to a down cut end of the rear of the previously welded billet, so that a weld to be formed by the flash welding device can be deburred successfully by the shaving cutters.

In step 503, a billet rotation means is operated, based on the determined rotation, to rotate the billet around the longitudinal axis of the billet, for flash welding to form endless bar for continuously rolling into a rolled product.

In step 504, flash welding of the aligned billets is performed using the flash welding device.

In step 505, the excess weld material is deburred from the flash welded joint of the formed endless bar with the one or more shaving cutters.

In step 506, the formed endless bar is continuously rolled into rolled steel products.

The object of this invention is to make the flash welding machines more versatile, being able to accept all kinds of billet end cuts, including down cut ends, with obvious advantages because of the flexibility.

The invention claimed is:

1. A method for welding together steel billets having down cut ends, each down cut end comprising a deformation in a cross section of the billet by one side surface of the billet extending increasingly inwardly into a profile of the billet in an end region of the billet relative to a normal square cross sectional profile of the billet away from an end portion of the billet, the deformation resulting from a previous cutting operation, the method using a flash welding device and one or more shaving cutters for removing excess weld material, to form endless bar for rolling into a rolled product, the method comprising steps of:
   determining an orientation of a down cut end of a front of a billet to be welded to a rear of a previously welded billet;
   determining, based on the orientation, whether the billet to be welded to the previously welded billet needs to be rotated around a longitudinal axis of the billet to align the down cut end at the front of the billet to a down cut end of the rear of the previously welded billet, so that a weld to be formed by the flash welding device can be deburred successfully by the one or more shaving cutters;
   operating a billet rotation device, based on the determined orientation, to rotate the billet around the longitudinal axis of the billet, to form endless bar for rolling into a rolled product;
   flash welding the aligned billets using the flash welding device; and
   deburring the excess weld material from the flash welded joint of the formed endless bar with the one or more shaving cutters.

2. The method of claim 1, wherein the cutting operation forming the down cut end is characterised by:
   having been performed by a mechanical shear comprising a stationary shear and a moving shear arranged to be on opposite faces of the billet, with the moving shear moving towards the stationary shear to cut through a cross section of the billet in between; and
   with the resultant deformation causing the surface of one side of the billet to extend inwardly into the profile of the billet by at least 25 mm or more, or by at least 10% of a thickness of the normal cross sectional profile of the billet.

3. The method of claim 1, wherein the deformed down cut end region of the billet comprises at least 10 centimetres at the end of the billet.

4. The method of claim 1, further comprising controlling a flash time and an upsetting distance of the flash welding device such that the excess weld material protrudes out of the profile of the billets on the side of the deformed surface of the down cut ends of the billets to allow the excess weld material to be successfully deburred by one or more shaving cutters.

5. The method of claim 1, wherein the shaving cutters are configured to cut inside the profile of the normal square cross section of a welded endless bar on at least the side of the deformed surface of the down cut ends of the billets in order that a depth of the cut is to remove all of the excess weld material from the flash welding joint.

6. The method of claim 1, wherein the rotation of the billet, to be welded to a previously welded billet, around its longitudinal axis is to complimentarily align the down cut ends of the billets to be welded together in the same direction, or oppositely align the down cut ends of the billets to be welded together in an opposite direction, so that a weld to be formed by the flash welding device can be deburred successfully by the shaving cutters.

7. The method of claim 1, wherein the formed endless bar for rolling into rolled products is rolled in a one or more rolling stands such that the rolled product contains no surface imperfections or profile variations from the deburring of the excess weld material.

8. An apparatus for welding together steel billets having down cut ends, each down cut end comprising a deformation in a cross section of the billet by one side surface of the billet extending increasingly inwardly into a profile of the billet in an end region of the billet relative to a normal square cross sectional profile of the billet away from an end portion of the billet, the deformation resulting from a previous cutting operation, the welding being to form endless bar for rolling into rolled product, the apparatus comprising:
   a billet orientation determining means for determining an orientation of a down cut end of a front of a billet to be welded to a rear of a previously welded billet, and determining, based on the orientation, whether the billet to be welded to the previously welded billet needs to be rotated around a longitudinal axis of the billet to align the down cut end at the front of a billet to a down cut end of the rear of the previously welded billet;
   a billet rotation device configured to rotate the billet, based on the determined rotation, around its longitudinal axis of the billet to achieve the alignment; and
   a flash welding device for flash welding the aligned billets to form endless bar for rolling;
   one or more shaving cutters for deburring excess weld material from the weld joint between the billets;
   the determined rotation being so that a weld to be formed by the flash welding device can be deburred successfully by the shaving cutters.

9. The apparatus of claim 8, wherein the billet rotation device rotates the billet, to be welded to a previously welded billet, around its longitudinal axis is to complimentarily align the down cut ends of the billets to be welded together in the same direction, or oppositely align the down cut ends of the billets to be welded together in an opposite direction, so that a weld to be formed by the flash welding device can be deburred successfully by the shaving cutters.

10. The apparatus of claim 8, wherein the flash welding device is configured such that a flash time and an upsetting distance of the flash welding device are such that the excess weld material protrudes out of the profile of the billets on the side of the deformed surface of the down cut ends of the billets to allow the excess weld material to be successfully deburred by one or more shaving cutters.

11. The apparatus of claim 8, further comprising a reheat furnace arranged for heating each billet before flash welding so that the formed endless bar is sufficiently malleable to be rolled into rolled products.

12. The apparatus of claim 11, wherein the billet orientation determining means comprises one or more cameras coupled to one or more processors, positioned between the reheat furnace and the flash welding device, for determining the orientation of the down cut end of a billet.

13. The apparatus of claim 8, further comprising one or more rolling stands are used to continuously roll the formed endless bar into rolled products.

14. The apparatus of claim 8, wherein the shaving cutters comprise separate cutting means for each profile surface of the endless bar.

15. The apparatus of claim 8, wherein the shaving cutters are configured to cut inside the profile of the normal square cross section of a welded endless bar on at least the side of the deformed surface of the down cut ends of the billets in order that a depth of the cut is sufficient to remove all of the excess weld material from the flash welding joint.

16. The apparatus of claim 8, wherein the one or more shaving cutters deburr the weld such that the endless bar can be continuously rolled into rolled products, by one or more rolling stands, without surface imperfections from excess weld material.

* * * * *